US012610154B2

(12) United States Patent
Jain et al.

(10) Patent No.: US 12,610,154 B2
(45) Date of Patent: Apr. 21, 2026

(54) METHOD AND ELECTRONIC DEVICE FOR INTERESTED EVENT BASED IMAGE CAPTURE

(71) Applicant: SAMSUNG ELECTRONICS CO., LTD., Suwon-si (KR)

(72) Inventors: Anurag Mithalal Jain, Bangalore (IN); Gaurav Kumar Jain, Bangalore (IN); Praveen R Jadhav, Bangalore (IN); Kiran Nataraju, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 18/626,863

(22) Filed: Apr. 4, 2024

(65) Prior Publication Data

US 2024/0259699 A1 Aug. 1, 2024

Related U.S. Application Data

(63) Continuation of application No. PCT/KR2022/016046, filed on Oct. 20, 2022.

(30) Foreign Application Priority Data

Oct. 20, 2021 (IN) ............................. 202141047750
Sep. 2, 2022 (IN) ............................. 202141047750

(51) Int. Cl.
*H04N 23/951* (2023.01)
*H04N 23/667* (2023.01)

(52) U.S. Cl.
CPC ......... *H04N 23/951* (2023.01); *H04N 23/667* (2023.01)

(58) Field of Classification Search
CPC .... H04N 23/951; H04N 23/667; H04N 23/64; H04N 23/80; H04N 5/2628; G06F 16/53
(Continued)

(56) References Cited

U.S. PATENT DOCUMENTS 9,288,376 B2 3/2016 Walker et al.
9,836,484 B1 12/2017 Bialynicka-Birula et al.
(Continued)

FOREIGN PATENT DOCUMENTS

CN 103369239 A 10/2013
CN 113191205 A 7/2021
(Continued)

OTHER PUBLICATIONS

Communication issued on Oct. 21, 2024 by the European Patent Office in European Patent Application No. 22884067.4.
(Continued)

*Primary Examiner* — Usman A Khan
(74) *Attorney, Agent, or Firm* — Sughrue Mion, PLLC

(57) ABSTRACT

A method of performing interested event based image capture by an electronic device includes receiving a plurality of image frames, storing the plurality of image frames in a high-resolution buffer, converting the plurality of image frames into a plurality of low-resolution image frames, detecting an interested event in at least one low-resolution image frame of the plurality of low-resolution image frames, determining a visual score of the interested event in the at least one detected low-resolution image frame, and obtaining at least one image frame corresponding to the at least one detected low-resolution image frame from the high-resolution buffer, based on the visual score.

18 Claims, 13 Drawing Sheets

(58) Field of Classification Search
USPC ...................................................... 348/222.1
See application file for complete search history.

(56) References Cited

U.S. PATENT DOCUMENTS

| | | | |
|---|---|---|---|
| 10,735,671 B2 | 8/2020 | Marman et al. | |
| 2013/0019209 A1* | 1/2013 | Ishikawa ................ | H04N 23/80 |
| | | | 715/838 |
| 2013/0208165 A1 | 8/2013 | An et al. | |
| 2013/0258136 A1 | 10/2013 | Lee | |
| 2014/0313370 A1 | 10/2014 | Ju | |
| 2019/0037140 A1 | 1/2019 | Brunner et al. | |
| 2019/0147305 A1 | 5/2019 | Lu et al. | |
| 2020/0286525 A1* | 9/2020 | Van de Pol ............ | H04N 5/783 |
| 2021/0134326 A1* | 5/2021 | Liu ....................... | G11B 27/005 |
| 2021/0243363 A1* | 8/2021 | Petrescu ................ | H04N 23/64 |

FOREIGN PATENT DOCUMENTS

| | | |
|---|---|---|
| CN | 113329175 A | 8/2021 |
| WO | 2021/080039 A1 | 4/2021 |

OTHER PUBLICATIONS

International Search Report (PCT/ISA/210) issued by the International Searching Authority on Jan. 17, 2023 in International Application No. PCT/KR2022/016046.
Office Action issued on Oct. 13, 2023 by the Indian Patent Office in corresponding IN Patent Application No. 202141047750.

\* cited by examiner

Figure 1:
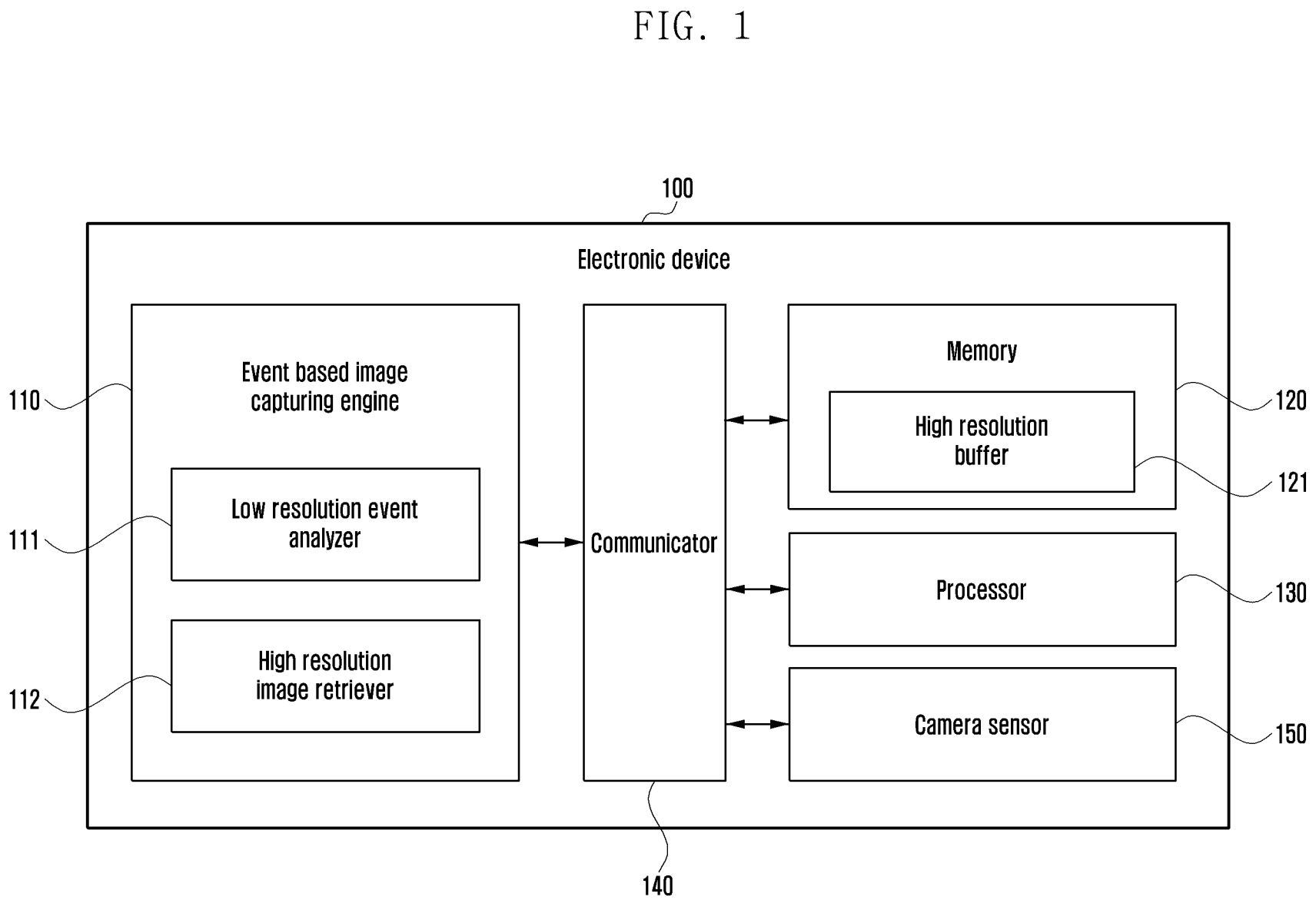

Electronic device

120 — Memory

121 — High resolution buffer

130 — Processor

150 — Camera sensor

140 — Communicator

Event based image capturing engine — 110

Low resolution event analyzer — 111

High resolution image retriever — 112

801 Camera sensor 150

802 ISP 130A

803 LoREA 111

804 HRR 112

High resolution ZSL buffers 121

805 Edge/Cloud based SAAS

METHOD AND ELECTRONIC DEVICE FOR INTERESTED EVENT BASED IMAGE CAPTURE

CROSS-REFERENCE TO RELATED APPLICATIONS

This application is a continuation application of International Application No. PCT/KR2022/016046, filed on Oct. 20, 2022, which claims priority to Indian Non-Provisional Application No. 202141047750, filed on Sep. 2, 2022, and to Indian Provisional Application No. 202141047750, filed on Oct. 20, 2021, in the Indian Patent Office, the disclosures of which are incorporated by reference herein in their entireties.

BACKGROUND

1. Field

The disclosure relates to an electronic device, and more particularly, to a method and an electronic device for an interested event based image capture.

2. Description of Related Art

A user of an electronic device (e.g., a camera, a smartphone, a tablet computer, a personal digital assistant (PDA), a wearable device, any other type of mobile computing device, and the like) may attempt to capture, with the electronic device, an image of an interested scene, such as, but not limited to, a flying airplane, a blasting cracker, a standing horse, any scene of interest to the user, and the like.

A user of an electronic device (e.g., a camera, a smartphone, a tablet computer, a personal digital assistant (PDA), a wearable device, any other type of mobile computing device, and the like) may attempt to capture, with the electronic device, an image of an interested scene, such as, but not limited to, a flying airplane, a blasting cracker, a standing horse, and the like. When the interested scene contains substantially stationary (and/or slow moving) objects in a field of view (FOV) of the electronic device, the user may be able to trigger the image capture with sufficient time to capture an image of the interested scene. However, when the interested scene contains moving (e.g., fast moving) objects, the user may not be able to trigger the image capture when the moving objects of the interested scene are within the FOV of the electronic device. Consequently, the user of the electronic device may miss the opportunity to capture an image of the interested scene as desired by the user.

In order to possibly avoid missing to capture the interested scene, the user may capture continuous burst shots of the scene, which the user may later manually examine and choose at least one image from the burst shots that contains the interested scene. Typically, image sizes of burst shots are relatively large, and as such, a relatively large amount of storage and computational resources of the electronic device may be consumed for capturing the burst shots. Additionally, such a manual solution may be time consuming and may require human intervention, which may degrade the user experience. Moreover, burst shots typically capture images for a fixed time duration, and as a result, the interested scene may be missed (e.g., not captured) if the interested scene does not occur during the fixed time duration.

Alternatively or additionally, the electronic device may analyze each image frame in the FOV in real time, detect an event in the FOV, and trigger the image capture based on the detecting of the event. However, such a technique may require a relatively large amount of computational resources (e.g., memory space, processing power) to be consumed for analyzing the image frame in high resolution, which may degrade overall performance of the electronic device. Additionally, such a technique may be inefficient in capturing the interested scene due to processing latency in generating a request for the image capture, which causes the image capture to miss the interested scene.

Thus, there exists a need for further improvements in interested event based image capture, as the need for capturing interested scenes may be constrained by computational resources of the electronic device. Improvements are presented herein. These improvements may also be applicable to other image capturing technologies.

SUMMARY

Provided are a method and an electronic device for an interested event based image capture. A related image capture technique may require a user to manually track a moving object and trigger an image capture at a particular moment (e.g., time instance). However, one or more example embodiments of the present disclosure allow for an electronic device to automatically capture an image of a scene with an interested event, and thereby, potentially improve a user experience. For example, the user may not be required to capture burst shots of the scene and to manually choose image frames capturing the interested event, and hence, storage and computational resources consumed by the electronic device may be reduced when compared to a related electronic device. Moreover, a time duration for capturing the image frames with the interested event may not be limited to a predetermined burst short duration.

Further, one or more example embodiments of the present disclosure provide for analysis of low resolution image frames of a scene in real-time and generation of scores for each low-resolution image frame based on an interested event of a user. For example, the electronic device may retrieve the high-resolution image frames from a high-resolution buffer corresponding to the low-resolution image frames with a highest score. Further, one or more example embodiments of the present disclosure provide an electronic device having a substantially zero delay in interested event detection, and thus, substantially reducing a probability of missing the capture of the interested events.

According to an aspect of the present disclosure, a method of performing interested event based image capture by an electronic device includes receiving a plurality of image frames, storing the plurality of image frames in a high-resolution buffer, converting the plurality of image frames into a plurality of low-resolution image frames, detecting an interested event in at least one low-resolution image frame of the plurality of low-resolution image frames, determining a visual score of the interested event in the at least one detected low-resolution image frame, and obtaining at least one image frame corresponding to the at least one detected low-resolution image frame from the high-resolution buffer, based on the visual score.

In some embodiments, the detecting of the interested event may include calculating an average intensity at each pixel location of one or more low-resolution image frames of the plurality of low-resolution image frames, determining a differential intensity change at each pixel location of the one or more low-resolution image frames, based on the average intensity for each pixel location of the one or more low-resolution image frames, and, based on determining that the differential intensity change for the at least one detected low-resolution image frame meets a differential intensity change threshold, detecting the interested event in the at least one detected low-resolution image frame of the one or more low-resolution image frames.

In some embodiments, the determining of the visual score may include determining a timestamp of the at least one detected low-resolution image frame, and storing, into a memory of the electronic device, a list including the visual score and the timestamp of each low-resolution image frame of the at least one detected low-resolution image frame.

In some embodiments, the determining of the visual score may include determining the visual score of the interested event in the at least one detected low-resolution image frame, based on a spatiotemporal location of a differential intensity change and a magnitude of the differential intensity change.

In some embodiments, the method may include maintaining the timestamp of the at least one detected low-resolution image frame, based on a sorted order of visual scores of the at least one detected low-resolution image frame over a sliding time window, and adjusting a size of the sliding time window to match a number of the plurality of image frames stored in the high-resolution buffer.

In some embodiments, the obtaining of the at least one image frame corresponding to the at least one detected low-resolution image frame may include determining at least one timestamp having a higher visual score from a list stored in a memory of the electronic device compared to remaining visual scores from the list, the list including visual scores of each low-resolution image frame of the at least one detected low-resolution image frame, accessing timestamps of the plurality of image frames stored in the high-resolution buffer, and retrieving the at least one image frame from the stored plurality of image frames based on a match between the at least one timestamp having the higher visual score and the timestamps of the stored plurality of image frames.

In some embodiments, the obtaining of the at least one image frame may include obtaining, from the high-resolution buffer, the at least one image frame while performing automatic snapshot capture, and the performing of the automatic snapshot capture may include at least one of previewing and recording a video in at least one of a live mode and a non-live mode.

In some embodiments, the method may include deriving, based on the at least one obtained image frame, at least one of segments of high-resolution images and a video of interest, and analyzing the at least one of the segments and the video for image post-processing.

In some embodiments, the detecting of the interested event may include receiving, from a user, an input identifying the interested event.

According to an aspect of the present disclosure, an electronic device for performing interested event based image capture includes a memory storing instructions, and one or more processors configured to execute the instructions to receive a plurality of image frames, store the plurality of image frames in a high-resolution buffer, convert the plurality of image frames into a plurality of low-resolution image frames, detect an interested event in at least one low-resolution image frame of the plurality of low-resolution image frames, determine a visual score of the interested event in the at least one detected low-resolution image frame, and obtain at least one image frame corresponding to the at least one detected low-resolution image frame from the high-resolution buffer based on the visual score.

In some embodiments, the one or more processors are further configured to execute the instructions to determine an average intensity at each pixel location of one or more low-resolution image frames of the plurality of low-resolution image frames, determine a differential intensity change at each pixel location of the one or more low-resolution image frames, based on the average intensity calculated for each pixel location of one or more low-resolution image frames, and, based on a determination that the differential intensity change for the at least one detected low-resolution image frame meets a differential intensity change threshold, detect the interested event in the at least one detected low-resolution image frame of the one or more low-resolution image frames.

In some embodiments, the one or more processors are further configured to execute the instructions to determine a timestamp of the at least one detected low-resolution image frame, and store, into the memory, a list including the visual score and the timestamp of each low-resolution image frame of the at least one detected low-resolution image frame.

In some embodiments, the one or more processors are further configured to execute the instructions to determine the visual score of the interested event for in the at least one detected low-resolution image frame, based on a spatiotemporal location of a differential intensity change and a magnitude of the differential intensity change.

In some embodiments, the one or more processors are further configured to execute the instructions to maintain the timestamp of the at least one detected low-resolution image frame, based on a sorted order of visual scores of the at least one detected low-resolution image frame over a sliding time window, and adjust a size of the sliding time window to match a number of the plurality of image frames stored in the high-resolution buffer.

In some embodiments, the one or more processors are further configured to execute the instructions to determine at least one timestamp having a higher visual score from a list stored in the memory of the electronic device compared to remaining visual scores from the list, the list including visual scores of each low-resolution image frame of the at least one detected low-resolution image frame, access timestamps of the plurality of image frames stored in the high-resolution buffer, and retrieve the at least one image frame from the stored plurality of image frames based on a match between the at least one timestamp having the higher visual score and the timestamps of the stored plurality of image frames.

In some embodiments, the one or more processors are further configured to execute the instructions to derive, based on the at least one obtained image frame, at least one of segments of high-resolution images and a video of interest, and analyze the at least one of the segments and the video for image post-processing.

In some embodiments, the one or more processors are further configured to execute the instructions to obtain, from the high-resolution buffer, the at least one image frame while performing automatic snapshot capture, and the automatic snapshot capture may include performing at least one of previewing and recording a video in at least one of a live mode and a non-live mode.

In some embodiments, the one or more processors are further configured to execute the instructions to receive, from a user, an input identifying the interested event.

According to an aspect of the present disclosure, a method of performing interested event based image capture by an electronic device includes converting a plurality of image frames into a plurality of low-resolution image frames, calculating an average intensity at each pixel location of one or more low-resolution image frames of the plurality of low-resolution image frames, determining a differential intensity change at each pixel location of the one or more low-resolution image frames, based on the average intensity calculated for each pixel location of the one or more low-resolution image frames, detecting an interested event in at least one low-resolution image frame of the one or more low-resolution image frames, based on determining that a differential intensity change for the at least one low-resolution image frame meets a differential intensity change threshold, determining a visual score of the interested event in the at least one detected low-resolution image frame, and obtaining at least one image frame corresponding to the at least one detected low-resolution image frame from a high-resolution buffer, based on the visual score.

In some embodiments, the method may include maintaining the timestamp of the at least one detected low-resolution image frame, based on a sorted order of visual scores of the at least one detected low-resolution image frame over a sliding time window, and adjusting a size of the sliding time window to match a number of the plurality of image frames stored in the high-resolution buffer.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 1 is a block diagram of an electronic device for interested event based image capture, according to an embodiment;

FIG. 4A is a flow diagram of a method for auto event capturing in a photo mode with zero latency, according to an embodiment;

FIG. 5A is a flow diagram of a method for simultaneous video recording and capturing of event based live snapshots, according to an embodiment;

FIG. 8A is a flow diagram of a method for optimizing a network bandwidth and latency for cloud based image processing, according to an embodiment.

DETAILED DESCRIPTION

Figure 2:
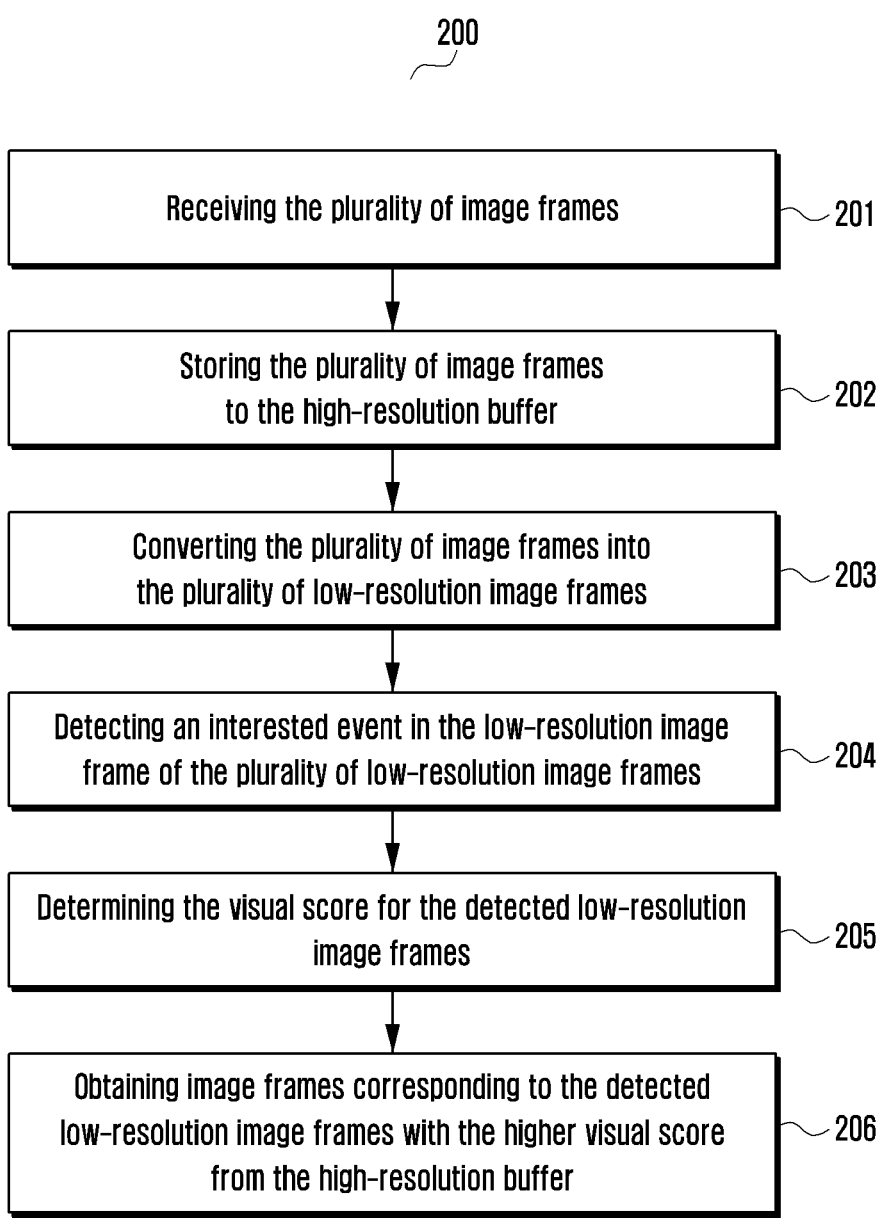
FIG. 2 is a flow diagram illustrating a method for the interested event based image capture, according to an embodiment.

The embodiments described herein and the various features and advantages details thereof are explained with reference to the accompanying drawings. Descriptions of well-known components and processing techniques may be omitted so as to not unnecessarily obscure the embodiments described herein. In addition, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments described herein may be described and illustrated in terms of blocks which may carry out a described function and/or functions. These blocks, which may be referred to herein as managers, units, modules, or the like, or by names such as device, logic, circuit, controller, counter, comparator, generator, converter, or the like, may be physically implemented by analog and/or digital circuits including one or more elements such as, but not limited to, logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, by a processor, or by a combination of processors (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Similarly, the blocks of the embodiments may be physically combined into more complex blocks without departing from the scope of the disclosure.

The accompanying drawings are provided to assist in a comprehensive understanding of various technical features and it is to be understood that the embodiments presented herein are not limited by the accompanying drawings. As such, the present disclosure should be construed to extend to any alterations, equivalents, and substitutes in addition to those which are particularly set out in the accompanying drawings.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Users of related electronic devices (e.g., cameras, smartphones, tablet computers, personal digital assistants (PDAs), wearable devices, other types of mobile computing devices, and the like) may experience difficulty when attempting to capture an image of a scene of interest at a particular moment using optimal settings for the scene. For example, the user may need to practice and/or to learn through trial and error how to capture interested scenes using optimal settings, and even so, the user may either miss capturing the interested scene at the particular moment and/or capture images without optimal settings. That is, the user may be unable to capture an image at the particular moment when the interested event occurs in the scene.

One or more embodiments provide an event driven multimodal zero-shutter-lag (e.g., zero delay event) method for running event analysis engines on image capturing pipelines after computing differential energy changes on low resolution images followed by a high-resolution image retrieval operation.

One or more embodiments herein provide a method of interested event based image capture to be performed by an electronic device. The method may include receiving a plurality of image frames. The method may further include storing the plurality of image frames in a high-resolution buffer. The method may further include converting the plurality of image frames into a plurality of low-resolution image frames. The method may further include detecting an interested event in low-resolution image frames of the plurality of low-resolution image frames. The method may further include determining a visual score of the interested event in the detected low-resolution image frames. The method may further include obtaining image frames corresponding to the detected low-resolution image frames from the high-resolution buffer based on the visual score of the interested event in the detected low-resolution image frames.

One or more embodiments herein provide an electronic device for performing interested event-based image capture. The electronic device may include an event based image capturing engine, a memory, and a processor, where the event based image capturing engine may be communicatively coupled to the memory and the processor. The event based image capturing engine may be configured execute instructions stored in the memory, where the instructions, when executed by the event based image capturing engine, cause the electronic device to receive a plurality of image frames, store the plurality of image frames in a high-resolution buffer, convert the plurality of image frames into a plurality of low-resolution image frames, detect an interested event in the low-resolution image frames of the plurality of low-resolution image frames, determine a visual score of the interested event in the detected low-resolution image frames, obtain an image frame corresponding to the detected low-resolution image frames from the high-resolution buffer based on the visual score of the interested event in the detected low-resolution image frames.

One or more embodiments described herein may provide advantages over related electronic devices by potentially reducing a time and number of images captured by the user to obtain at least one image that contains the interested event with optimal settings. Alternatively or additionally, the one or more embodiments described herein may potentially reduce memory consumption requirements needed to store the images for post-processing and/or potentially reduce an overall computation time and power, when compared to related electronic devices.

One or more embodiments described herein may preclude the user from having to correctly time pressing a camera shutter button (or performing an equivalent action) of the electronic device when capturing images of moving objects or dynamic scenes to ensure that an interested event is captured. Alternatively or additionally, one or more embodiments described herein may allow the user to a-priori mark the interested event, so that the electronic device may return those images either by automatic capturing or whenever the user presses the camera shutter button and chooses a closest event in a timeline.

Further, one or more embodiments described herein may provide for the electronic device to simultaneously record video and capture snapshots (e.g., images) of interested moments automatically, to optimize usage of computational resources (e.g., memory footprint, processing throughput) of the electronic device, without the user having to resort to capturing multiple and/or bursts of images, and significantly minimizing the possibility of missing to capture the interested event.

Unlike existing methods and systems, one or more embodiments provide an electronic device configured to store unprocessed high-resolution images in zero shutter lag (ZSL) buffers, as the images are received from a camera sensor. In addition, the electronic device may maintain the ZSL buffers based on a visual score, rather than time-stamps. As used herein, the ZSL buffers may refer to sliding window buffers that may be implemented in a memory (e.g., random access memory (RAM) of the electronic device. Consequently, the aspects described herein may provide for automated interested event based image capture over a relatively long time duration without overburdening computing resources (e.g., memory footprint, processing throughput) of the electronic device.

Related image capture techniques may require a user to manually track a moving object and trigger an image capture at a particular moment (e.g., time instance). However, aspects of the present disclosure may allow for an electronic device to automatically capture the image of the scene with an interested event, and thereby, potentially improve user experience. For example, the user may not be required to capture burst shots of the scene and to manually choose image frames capturing the interested event, and hence, storage and computational resources consumed by the electronic device may be reduced when compared to a related electronic device. Moreover, a time duration for capturing the image frames with the interested event may not be limited to a predetermined burst short duration.

Further, one or more embodiments provide for analysis of low resolution image frames of the scene in real-time and generation of visual scores for each low-resolution image frame based on an interested event of a user. For example, the electronic device may retrieve the high-resolution image frames from a high-resolution buffer corresponding to the low-resolution image frames with a highest visual score. Further, one or more embodiment s provide for an electronic device having a substantially zero delay in interested event detection, and thus, substantially reducing a probability of missing the capture of the interested events.

Hereinafter, various embodiments of the present disclosure are described with reference to the accompanying drawings.

FIG. 1 is a block diagram of an electronic device 100 for performing an interested event based image capture, according to an embodiment. Examples of the electronic device 100 may include, but are not limited to, a smartphone, a tablet computer, a PDA, an Internet of Things (IoT) device, a wearable device, a camera device, and the like. In an embodiment, the electronic device 100 may include an event based image capturing engine 110, a memory 120, a processor 130, a communicator 140, and a camera sensor 150.

The camera sensor 150 may be configured to capture an image in front of a field of view (FOV) of the camera sensor 150. The camera sensor 150 may be and/or may include, for example, an active-pixel sensor.

The event based image capturing engine 110 may be implemented by processing circuitry such as, but not limited to, logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the event based image capturing engine 110 may include a low resolution event analyzer (LoREA) 111, and a high resolution image retriever (HRR) 112. The LoREA 111 and the HRR 112 may be implemented by processing circuitry such as, but not limited to, logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The event based image capturing engine 110 may receive a plurality of image frames from a plurality of camera sensors 150 of the electronic device 100. Further, the event based image capturing engine 110 may store the plurality of image frames in a high-resolution buffer 121. The event based image capturing engine 110 may convert the plurality of image frames into a plurality of low-resolution image frames. The event based image capturing engine 110 may detect an interested event (e.g., skating, flying bird, jumping horse, and the like) in low-resolution image frames of the plurality of low-resolution image frames. The event based image capturing engine 110 may determine a visual score (e.g., five (5), nine (9), and the like) for the interested event in the detected low-resolution image frames. The event based image capturing engine 110 may obtain image frames corresponding to the detected low-resolution image frames from the high-resolution buffer 121 based on the visual score of the interested event in the detected low-resolution image frame. For example, the event based image capturing engine 110 may obtain the image frames corresponding to the detected low-resolution image frames based on one or more criteria, such as, but not limited to, a highest visual score, a lowest visual score, a mean of the visual scores, a median of the visual scores, and the like.

In an embodiment, for detecting the interested event in the low-resolution image frames of the plurality of low-resolution image frames, the event based image capturing engine 110 may receive an input for the interested event. In an embodiment, the user may provide the input for the interested event to the event based image capturing engine 110. Further, the event based image capturing engine 110 may determine a logarithm of an average of a summation of intensities at each pixel location of the low-resolution image frame. Further, the event based image capturing engine 110 may determine a differential energy (e.g., intensity) change at each pixel location of the low-resolution image frame based on the logarithm of the average of the summation of energies (e.g., intensities) at each pixel location of the low-resolution image frame. Further, the event based image capturing engine 110 may detect the interested event in the low-resolution image frames of the plurality of low-resolution image frames based on determining that the differential energy (e.g., intensity) change for the at least one low-resolution image frame meets a threshold differential energy (e.g., intensity) change.

In an embodiment, for determining the visual score for the detected low-resolution image frames, the event based image capturing engine 110 may determine a timestamp of the detected low-resolution image frames. Further, the event based image capturing engine 110 may determine the visual score for the detected low-resolution image frames with reference to the interested event. Further, the event based image capturing engine 110 may store a list including the visual score along with the timestamp of each detected low-resolution image frame into the memory 120. In an embodiment, the event based image capturing engine 110 may maintain the timestamps based on a sorted order of the visual scores over a sliding time window and may keep a size of the sliding time window the same as a number of image frames stored in the high-resolution buffer 121. In an embodiment, the event based image capturing engine 110 may determine the visual score for the detected low-resolution image frames based on a spatiotemporal location of a differential energy (e.g., intensity) change and a magnitude of the differential energy (e.g., intensity) change.

In an embodiment, for obtaining the image frames corresponding to the detected low-resolution image frames from the high-resolution buffer 121 based on the visual score of the interested event in the detected low-resolution image frames, the event based image capturing engine 110 may determine the timestamp with a higher visual score from a list stored in the memory 120 of the electronic device 100. Further, the event based image capturing engine 110 may determine the timestamps of the stored plurality of image frames. Further, the event based image capturing engine 110 may retrieve the image frame from the stored plurality of image frames based on a match between the timestamps with the higher visual score and the timestamps of the stored plurality of image frames. The event based image capturing engine 110 may use peak visual scores and associated time-stamps to pick (e.g., retrieve) one or more high reso-
lution ZSL buffers (e.g., HRR 112).

In an embodiment, the image frames may be obtained
from the high-resolution buffer 121 while previewing and/or
recording a video by the electronic device 100 for automatic
live/non-live snapshot capture.

In an embodiment, the event based image capturing
engine 110 may derive segments of high-resolution images
and/or a video of interest using the obtained image frames.
Further, the event based image capturing engine 110 may
analyze the segments for image post processing.

In another embodiment, the event based image capturing
engine 110 may derive the segments of high-resolution
images and/or the video of interest using the obtained image
frames. Further, the event based image capturing engine 110
may send the segments to a cloud/edge server, where the
cloud/edge server may analyze the segments for image post
processing.

The memory 120 may include the high-resolution buffer
121 (e.g., ZSL buffer). The memory 120 may store the list,
and/or the image captured and/or retrieved by the electronic
device 100. The memory 120 may store instructions to be
executed by the processor 130. The memory 120 may
include non-volatile storage elements. Examples of such
non-volatile storage elements may include, but not be lim-
ited to, magnetic hard discs, optical discs, floppy discs, flash
memories, forms of electrically programmable memories
(EPROM), electrically erasable and programmable (EE-
PROM) memories, and the like. In addition, the memory 120
may, in some embodiments, be considered a non-transitory
storage medium. The term "non-transitory" may indicate
that the storage medium is not embodied in a carrier wave
or a propagated signal. However, the term "non-transitory"
should not be interpreted that the memory 120 is non-
movable. In some embodiments, the memory 120 may be
configured to store larger amounts of information than its
storage space. In certain embodiments, a non-transitory
storage medium may store data that may, over time, change
(e.g., in RAM, cache memory, and the like). The memory
120 may be and/or may include an internal storage unit
and/or the memory 120 may be and/or may include an
external storage unit of the electronic device 100, a cloud
storage, or any other type of external storage.

The processor 130 may be configured to execute instruc-
tions stored in the memory 120. The processor 130 may be
and/or may include a general-purpose processor (e.g., a
central processing unit (CPU), an application processor
(AP), an image signal processor (ISP), and the like), and/or
a graphics-only processing unit (e.g., a graphics processing
unit (GPU), a visual processing unit (VPU) and the like).
The processor 130 may include multiple cores to execute the
instructions.

The communicator 140 may be configured for commu-
nicating internally between hardware components in the
electronic device 100. Further, the communicator 140 may
be configured to facilitate the communication between the
electronic device 100 and other devices via one or more
wired and/or wireless networks (e.g., radio technology). The
communicator 140 may include an electronic circuit specific
to a communication standard that enables wired or wireless
communication using that communication standard.

Although FIG. 1 shows the hardware components of the
electronic device 100 in a particular configuration, it is to be
understood that other embodiments are not limited thereon.
In other embodiments, the electronic device 100 may
include fewer components, additional components, different
components, or differently arranged components than those shown in FIG. 1. Further, the labels or names of the
components may be used only for illustrative purpose and
may not limit the scope of the present disclosure. One or
more components may be combined (e.g., integrated)
together to perform a substantially similar and/or the same
function for the interested event based image capture.

FIG. 2 is a flow diagram 200 illustrating a method for the
interested event based image capture, according to an
embodiment. In an embodiment, the method allows the
event based image capturing engine 110 to perform opera-
tions 201 to 206 of the flow diagram 200. At operation 201,
the method may include receiving the plurality of image
frames. At operation 202, the method may include storing
the plurality of image frames to the high-resolution buffer
121. At operation 203, the method may include converting
the plurality of image frames into the plurality of low-
resolution image frames. At operation 204, the method may
include detecting the interested event in the low-resolution
image frame of the plurality of low-resolution image frames.
At operation 205, the method includes determining the
visual score for the detected low-resolution image frames. At
operation 206, the method may include obtaining the image
frames corresponding to the detected low-resolution image
frames with the higher visual score from the high-resolution
buffer 121.

Figure 3:
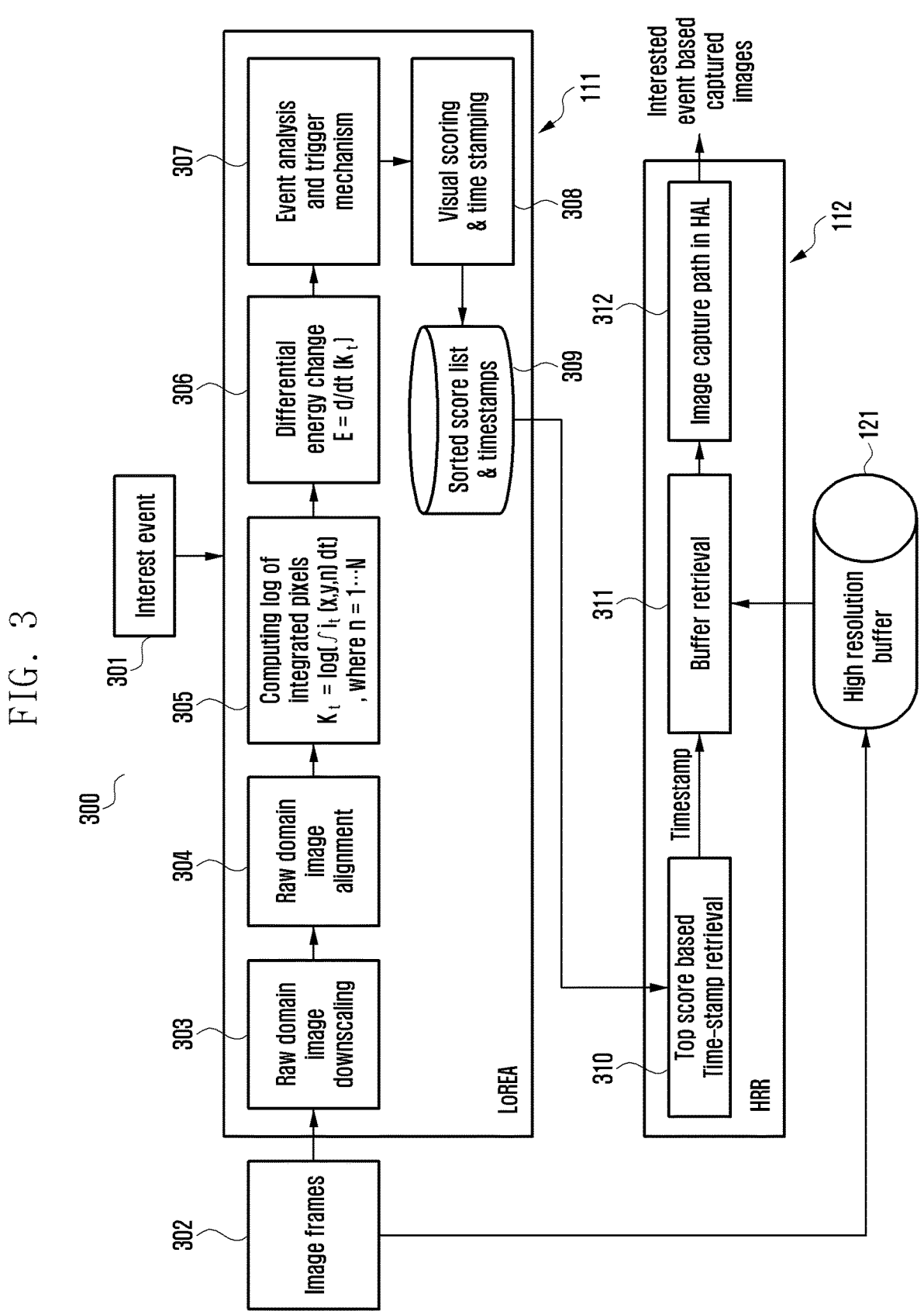
FIG. 3 illustrates a detailed flow diagram of the method for the interested event based image capture, according to an embodiment.

FIG. 3 illustrates a detailed flow diagram 300 of the
method for the interested event based image capture, accord-
ing to an embodiment. At operation 301, the LoREA 111
may receive the input for the interested event from the user.
At operation 302, the LoREA 111 may receive the image
frames (e.g., raw domain image) of the preview of the
camera sensor 150. At operations 303 and 304, the LoREA
111 may downscale the received image frames and may
align the downscaled image frames. At operation 305, the
LoREA 111 may determine (e.g., calculate) the logarithm of
the average of the summation of the intensities of each pixel
location of the aligned low-resolution image frame using an
equation similar to Equation 1.

The logarithm of the average of the summation of inten-
sities at pixel position (x, y) may be represented as an
equation similar to Equation 1.

$$K_{(x,y,t-1)} = \log \frac{1}{t} \sum_{n=0}^{t-1} I_{(x,y,n)} \qquad \text{Eq. 1}$$

Referring to Eq. 1, t may represent the size of sliding time
window in terms of number of image frames over which the
average of the summation of the intensities at each pixel
location is calculated.

At operation 306, the LoREA 111 may determine the
differential energy (e.g., intensity) change at each pixel
location of the low-resolution image frame based on the
logarithm of the average of the summation of the energy
(e.g., intensities) at each pixel location of low-resolution
image frame using an equation similar to Equation 2.

The differential energy (e.g., intensity) change at pixel
position (x, y) may be represented as an equation similar to
Equation 2.

$$E_{(x,y,t)} = K_{(x,y,t-1)} - \log I_{(x,y,t)} \qquad \text{Eq. 2}$$

At operation 307, the LoREA 111 may detect the inter-
ested event in the low-resolution image frames of the plurality of low-resolution image frames based on determining that the differential energy change for the at least one low-resolution image frame meets the threshold differential energy change. At operation 308, the LoREA 111 may determine the timestamp of the detected low-resolution image frames. Further, the LoREA 111 may determine the visual score for the detected low-resolution image frame with reference to the interested event. At operation 309, the LoREA 111 may store the list including the visual score along with the timestamp of each detected low-resolution image frame into the memory 120. At operation 310, the HRR 112 may determine the timestamps with top visual scores from the list. At operation 311, the HRR 112 may determine the timestamps of the plurality of image frames stored in the high-resolution buffer 121. Further, the HRR 112 may retrieve the image frames from the stored plurality of image frames based on the match between the timestamp with the top visual score and the timestamps of the stored plurality of image frames. At operation 312, the HRR 112 may provide the retrieved image frames through a hardware abstraction layer (HAL) and may store the retrieved image frames in the memory 120 and/or display the retrieved image frames to the user.

Figure 4A:
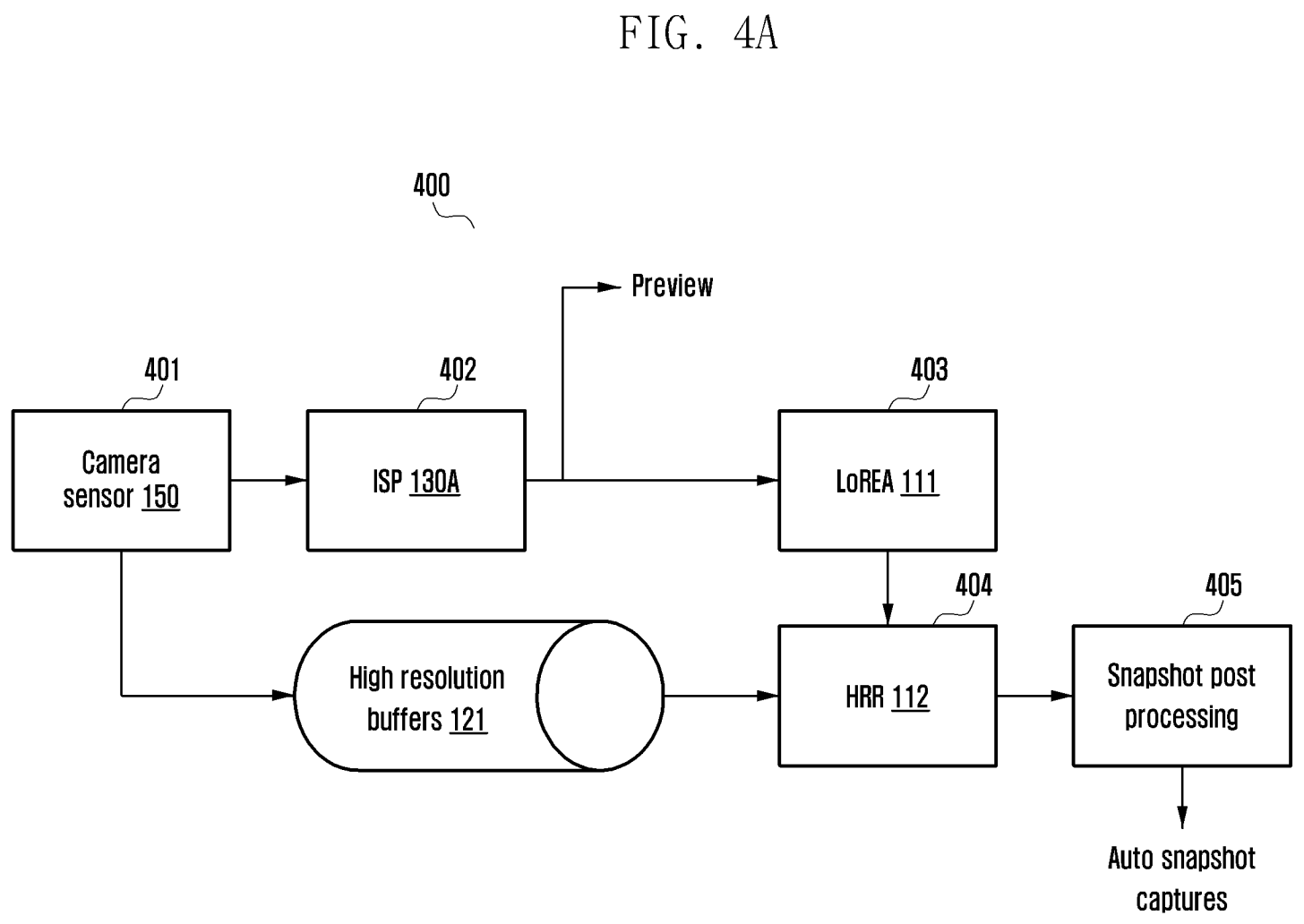

FIG. 4A is a flow diagram 400 of a method for auto event capturing in a photo mode with zero latency, according to an embodiment. At operations 401 to 403, the LoREA 111 may receive the image frames from the camera sensor 150 via an image signal processor (ISP) (130A) during the preview of the camera sensor 150. The ISP 130A may include and/or may be similar in many respects to the processor 130 described above with reference to FIG. 1, and may include additional features not mentioned above.

Further, the LoREA 111 may identify the time when the peak events occur. At operation 404, the HRR 112 may select the high-resolution images containing the peak events of interest. At operation 405, the HRR 112 may send the selected high-resolution images for further processing for automatic snapshot capture.

The method depicted in FIG. 4A may allow the user to choose the interested event as the input configuration for video recording and simultaneous event based high resolution photographic captures. The electronic device 100 may receive the continuous stream of the high-resolution image frames from one or more camera sensors 150. Further, the electronic device 100 may derive the stream of low-resolution image frames using the high-resolution image frames from the one or more camera sensors 150 while simultaneously storing unprocessed high-resolution images in the high-resolution buffer 121. Further, the electronic device 100 may perform event analysis on the low-resolution image frames for computing differential changes on the low-resolution image frames. Further, the electronic device 100 may determine the visual scores for each incoming low resolution image frame based on the interested event chosen by the user. Further, the electronic device 100 may automatically select the image frames with best visual score from the high-resolution buffer 121 based on the visual score and send the selected image frames for further processing with zero latency. Further, the electronic device 100 may perform additional analysis and/or processing of the selected image frames and refine the selection process, thereby potentially reducing the amount of data processed at each stage of the image post processing.

Figure 4B:
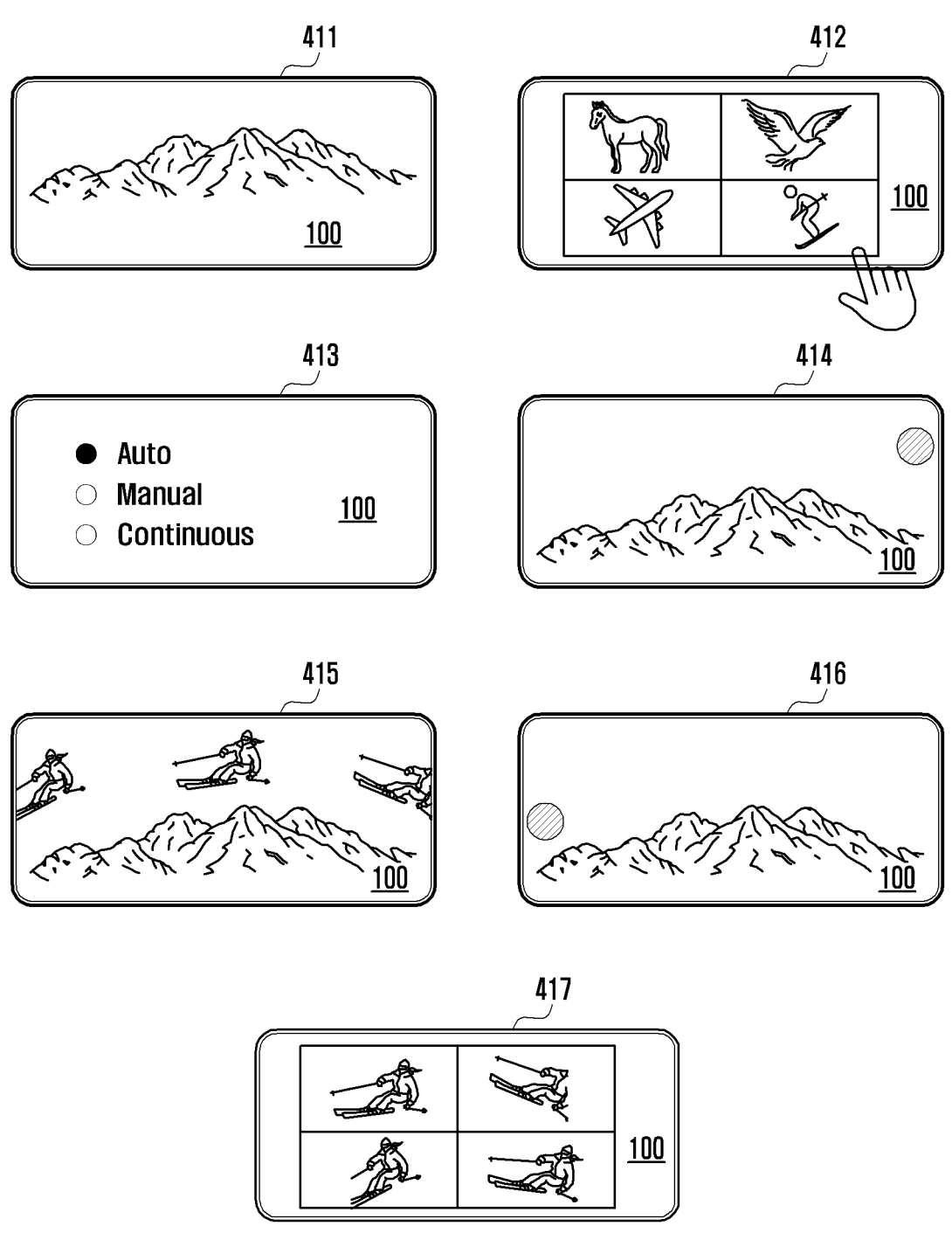
FIG. 4B illustrates an example scenario of auto event capturing in the photo mode with zero latency, according to an embodiment.

FIG. 4B illustrates an example scenario of auto event capturing in the photo mode with zero latency, according to an embodiment. At operation 411, the user may start the preview of the scene in front of the camera sensor 150 of the electronic device 100. At operation 412, the user may choose the type of interested event as having moving objects, having substantially no (zero) background motion, and/or as a specific type of interested event (e.g., snow skiing). At operation 413, the user may choose the mode of event capture from among a manual mode, an automatic (auto) mode, and a continuous mode. At operation 414, the electronic device 100 may start the event capture while the user holds the electronic device 100. At operation 415, the electronic device 100 may continue the preview, and capture a reel (e.g., sequence of images) of an event by automatically updating the image frames containing the interested events. At operation 416, the electronic device 100 may stop the event capturing. At operation 417, the electronic device 100 may move the image frames with the interested event from the reel to a gallery application to view all captured events in the high-resolution images.

Figure 5A:
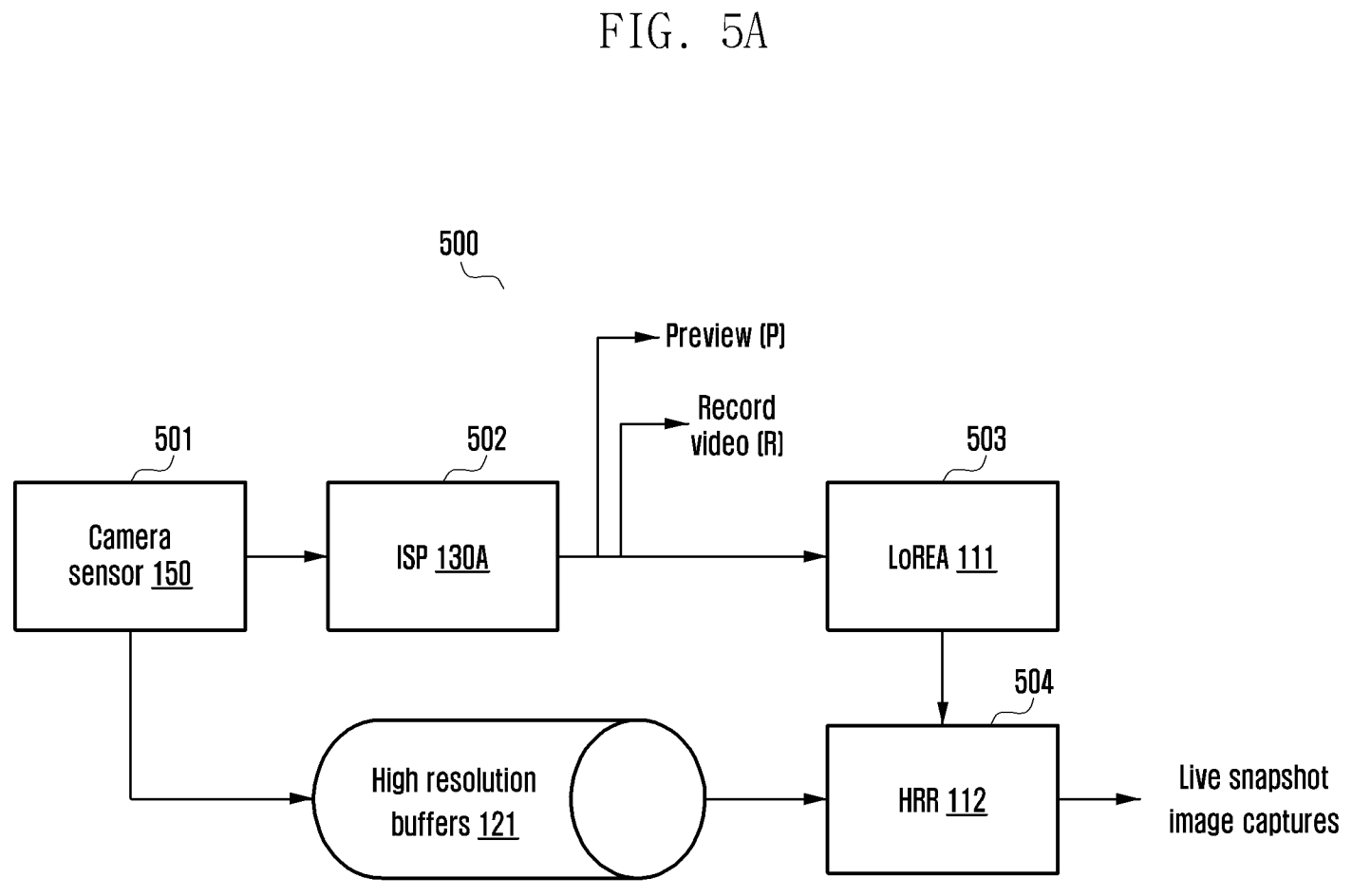

FIG. 5A is a flow diagram 500 of a method for simultaneous video recording and capturing of event based live snapshots, according to an embodiment. At operations 501 to 503, the LoREA 111 may receive the image frames from the camera sensor 150 via the ISP (130A) during the preview P of the camera sensor 150. Further, the LoREA 111 may analyze the low-resolution image frames at camera capture unit level to identify the frames corresponding to the interested event. At operation 504, the HRR 112 may select corresponding unprocessed high resolution raw image frames and send the selected high resolution raw image frames for further processing for live snapshot captures.

The method depicted in FIG. 5A may allow the user to choose the interested event as the input configuration for video recording and simultaneous event based high resolution photographic captures. The electronic device 100 may receive the continuous stream of the high-resolution image frames from one or more camera sensors 150. Further, the electronic device 100 may derive the stream of low-resolution image frames using the high-resolution image frames from one or more camera sensors 150 while simultaneously storing unprocessed high-resolution images in the high-resolution buffer 121. Further, the electronic device 100 may perform event analysis on the low-resolution image frames for computing the differential energy changes on the low-resolution image frames. Further, the electronic device 100 may determine the visual scores for each incoming low resolution image frame based on the interested event chosen by the user. Further, the electronic device 100 may automatically select the image frames for creating the live snapshot using the image frames with best score from the high-resolution buffer 121. Further, the electronic device 100 may perform additional analysis and processing of the selected image frames and refine the selection process, thereby potentially reducing the amount of data processed at each stage of the image post processing.

Figure 5B:
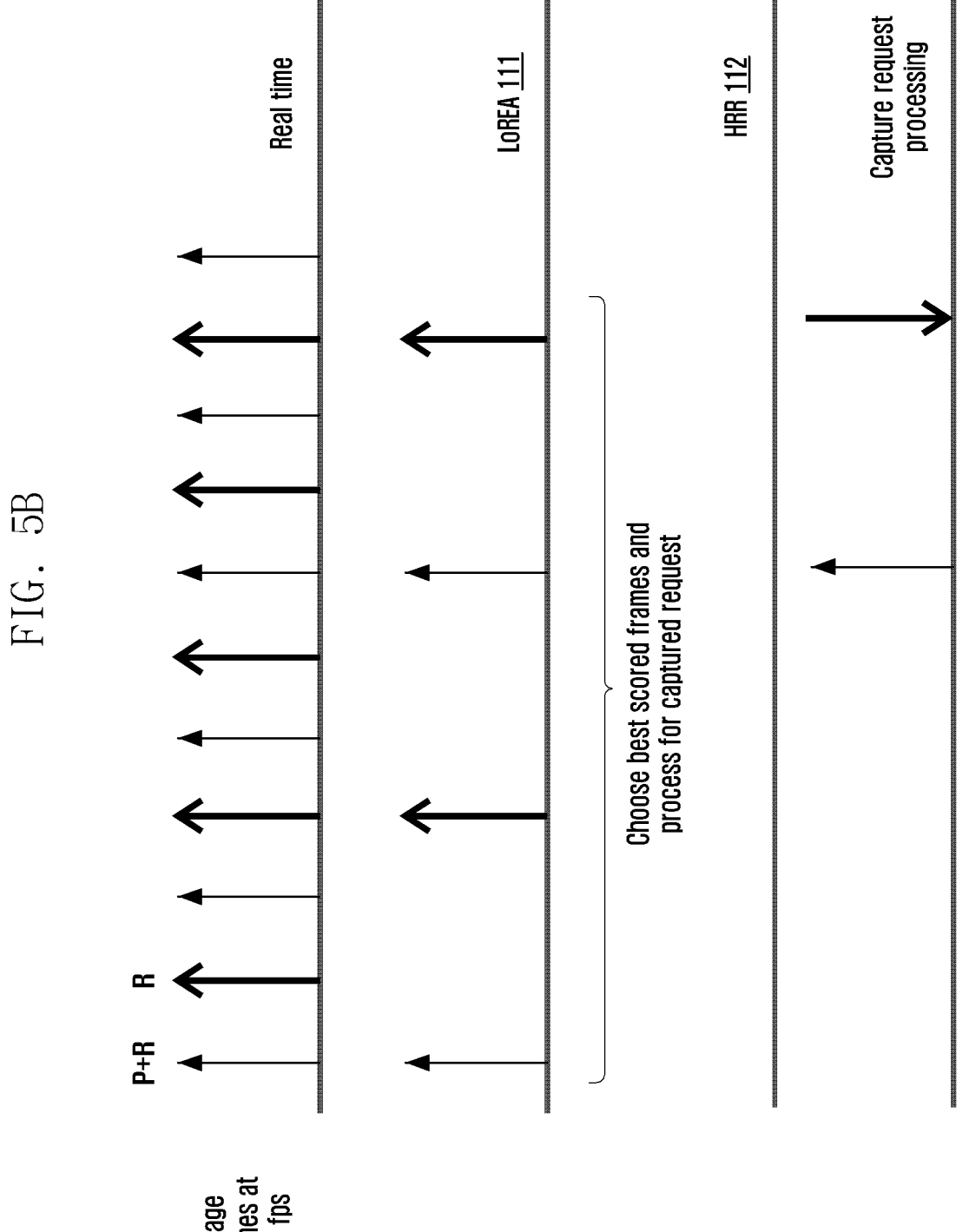
FIG. 5B illustrates an example of automatic extraction of live snapshots based on events detected by a low resolution event analyzer (LoREA) in real-time and corresponding high resolution image frames retrieved using a high resolution image retriever (HRR), according to an embodiment.

FIG. 5B illustrates an example of automatic extraction of live snapshots based on the events detected by the LoREA 111 in real-time and corresponding high resolution image frames retrieved using HRR 112, according to an embodiment. As shown in FIG. 5B, the frequency of high-resolution image frames retrieval and processing operations may be greatly reduced by the virtue of the LoREA 111, thereby potentially reducing the amount of data processed at each stage of the image post processing.

Figure 5C:
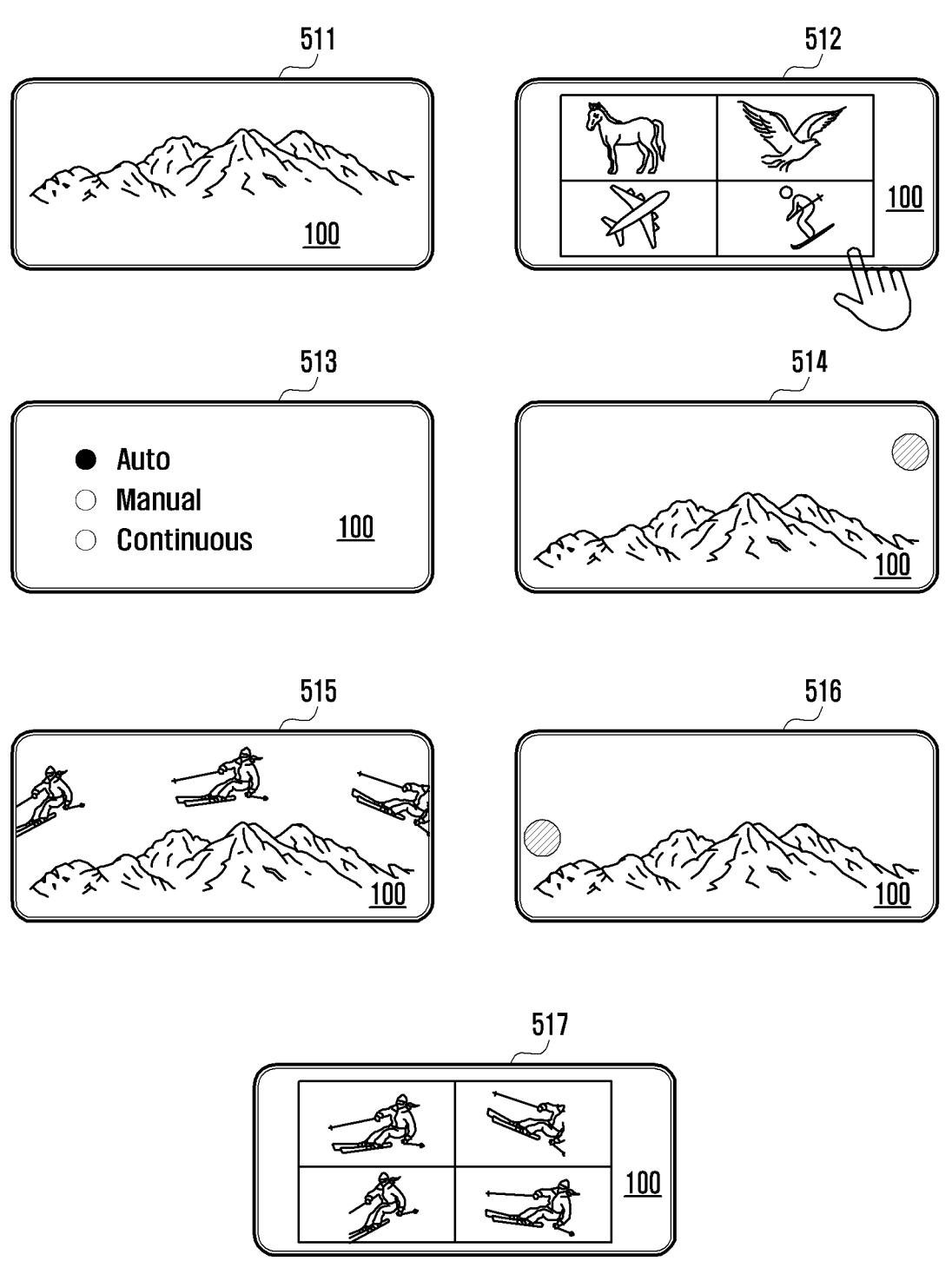
FIG. 5C illustrates an example scenario of the simultaneous video recording and capturing of the event based on live snapshots, according to an embodiment.

FIG. 5C illustrates an example scenario of the simultaneous video recording and capturing of the event based on live snapshots, according to an embodiment. At operation 511, the user may start the preview of the scene in front of the camera sensor 150 of the electronic device 100. At operation 512, the user may choose the type of interested event as having moving objects, having substantially no (zero) background motion, and/or as a specific type of interested event (e.g., snow skiing). At operation 513, the user may choose the mode of event captured from among a manual mode, an automatic (auto) mode, and a continuous mode. At operation 514, the electronic device 100 may start the event capture while the user holds the electronic device 100. At operation 515, the electronic device 100 may continue recording the video, and capture a reel (e.g., sequence of images) of the interested event by automatically updating the recorded video. At operation 516, the electronic device 100 may stop the video recording capture. At operation 517, the electronic device 100 may move the image frames with the interested event from the reel to a gallery application to view all captured events as the recorded video.

Figure 6:
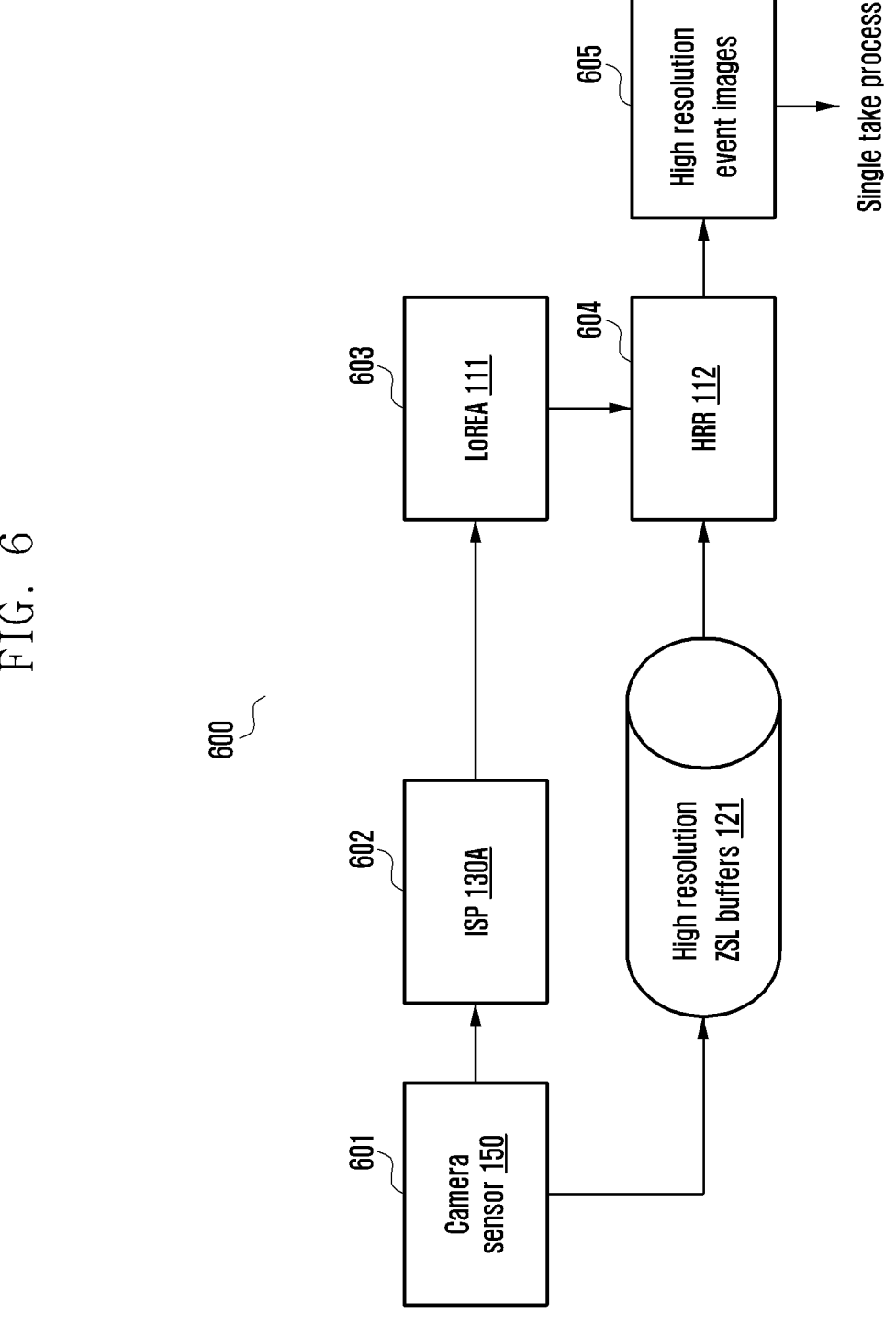
FIG. 6 is a flow diagram of a method for auto event capturing by reducing an amount of data to be processed for image post processing, according to an embodiment.

FIG. 6 is a flow diagram 600 of a method for auto event capturing that may potentially reduce the amount of data to be processed for the image post processing, according to an embodiment. At operations 601 to 603, the LoREA 111 may receive the image frames from the camera sensor 150 via the ISP 130A. Further, the LoREA 111 may analyze the low-resolution image frames at the camera capture unit level before passing the low-resolution image frames to another processes and/or entities. At operations 604 and 605, the HRR 112 may select corresponding unprocessed high resolution raw image frames and send the selected raw image frames for further processing for a single image capturing process.

The method depicted in FIG. 6 may allow the user to choose the interested event as the input configuration for video recording and simultaneous event based high resolution photographic captures. The electronic device 100 may receive the continuous stream of the high-resolution image frames from the one or more camera sensors 150. Further, the electronic device 100 may derive the stream of low-resolution image frames using the high-resolution image frames from the one or more camera sensors 150 while simultaneously storing unprocessed high-resolution images in the high-resolution buffer 121. Further, the electronic device 100 may perform event analysis on the low-resolution image frames for computing the differential energy changes on the low-resolution image frames. Further, the electronic device 100 may determine the visual scores for each incoming low resolution image frame based on the interested event chosen by the user. Further, the electronic device 100 may derive segments of high-resolution images and/or video of the interested event and send the high-resolution images and/or video for further post processing. Further, the electronic device 100 may perform additional analysis and/or processing of the derived segments and refine the selection process, thereby potentially reducing the amount of data processed at each stage of the image post processing.

Figure 7A:
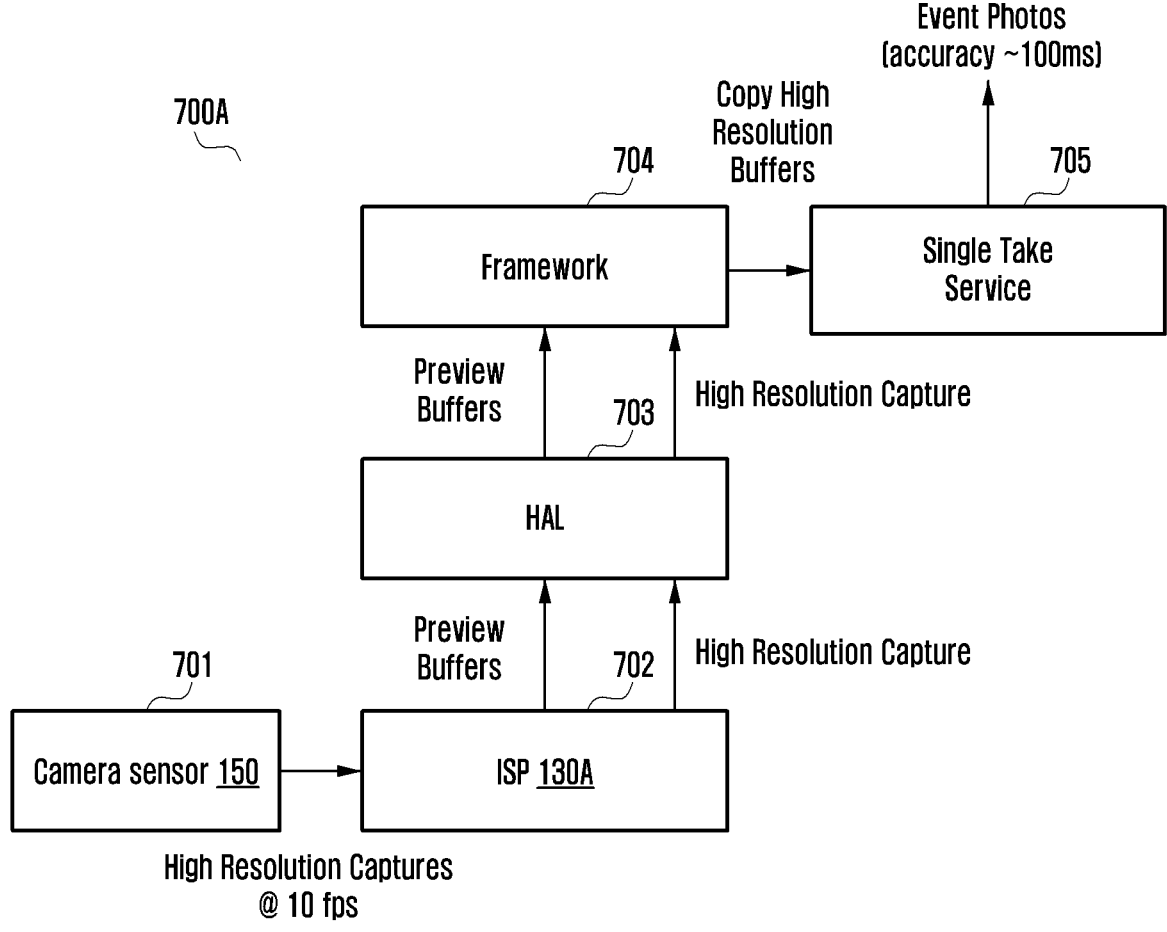
FIGS. 7A and 7B illustrate image capturing methods of interested event based image capturing, according to some embodiments.
Figure 7B:
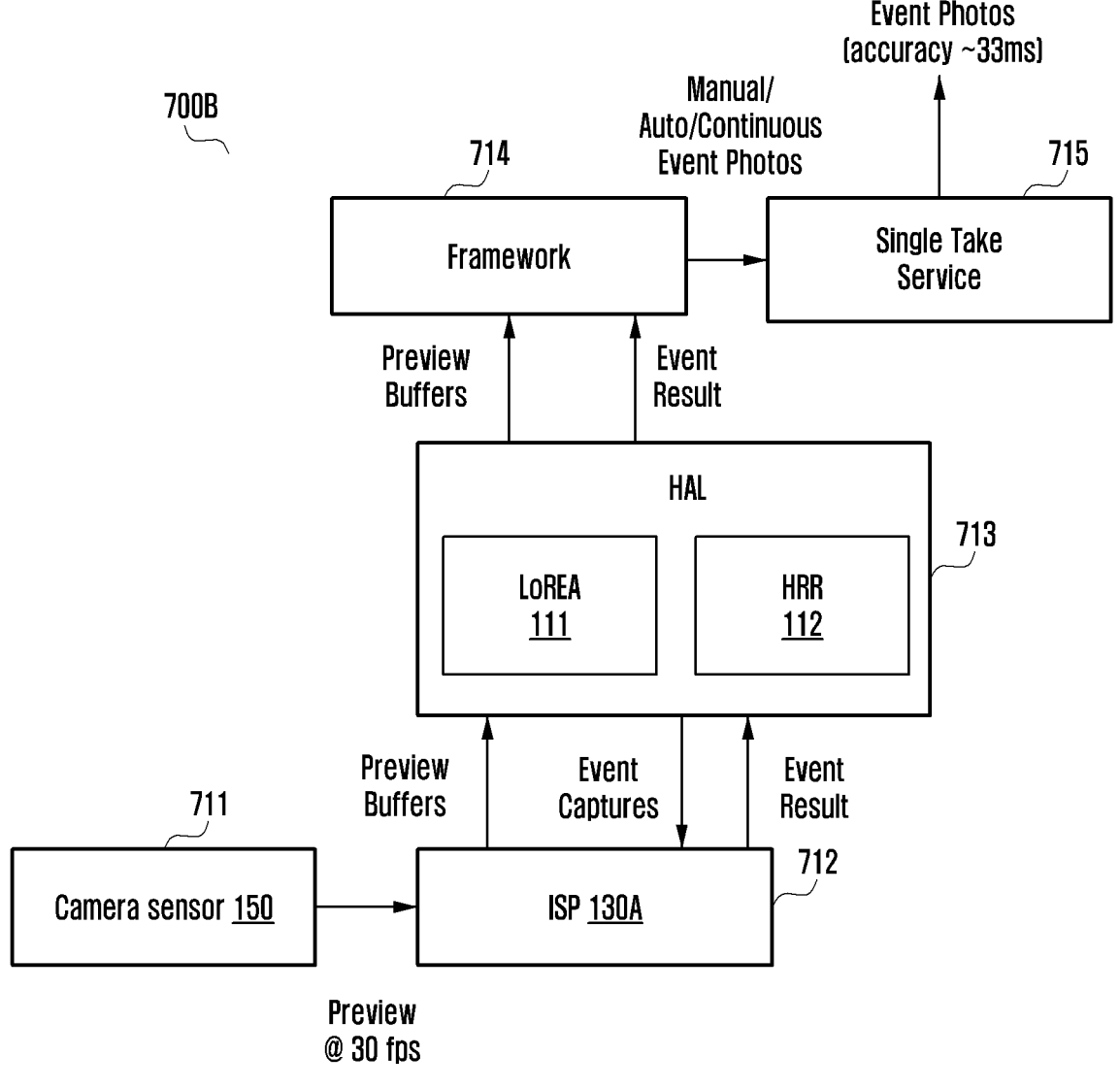

FIGS. 7A and 7B illustrate image capturing methods, according to some embodiments. Referring to FIG. 7A, a related image capture and post processing method 700A is illustrated. In a case of a single take of the image, operations 701 to 705 of the method 700A may result in large number of uneventful/redundant high-resolution buffers being returned for post-processing. Referring to FIG. 7B, a method 700B (e.g., operations 710 to 715) is illustrated in which LoREA 111 and HRR 112 modules are integrated inside a HAL 713 to capture the high-resolution buffers only when the interested event occurs.

Figure 8A:
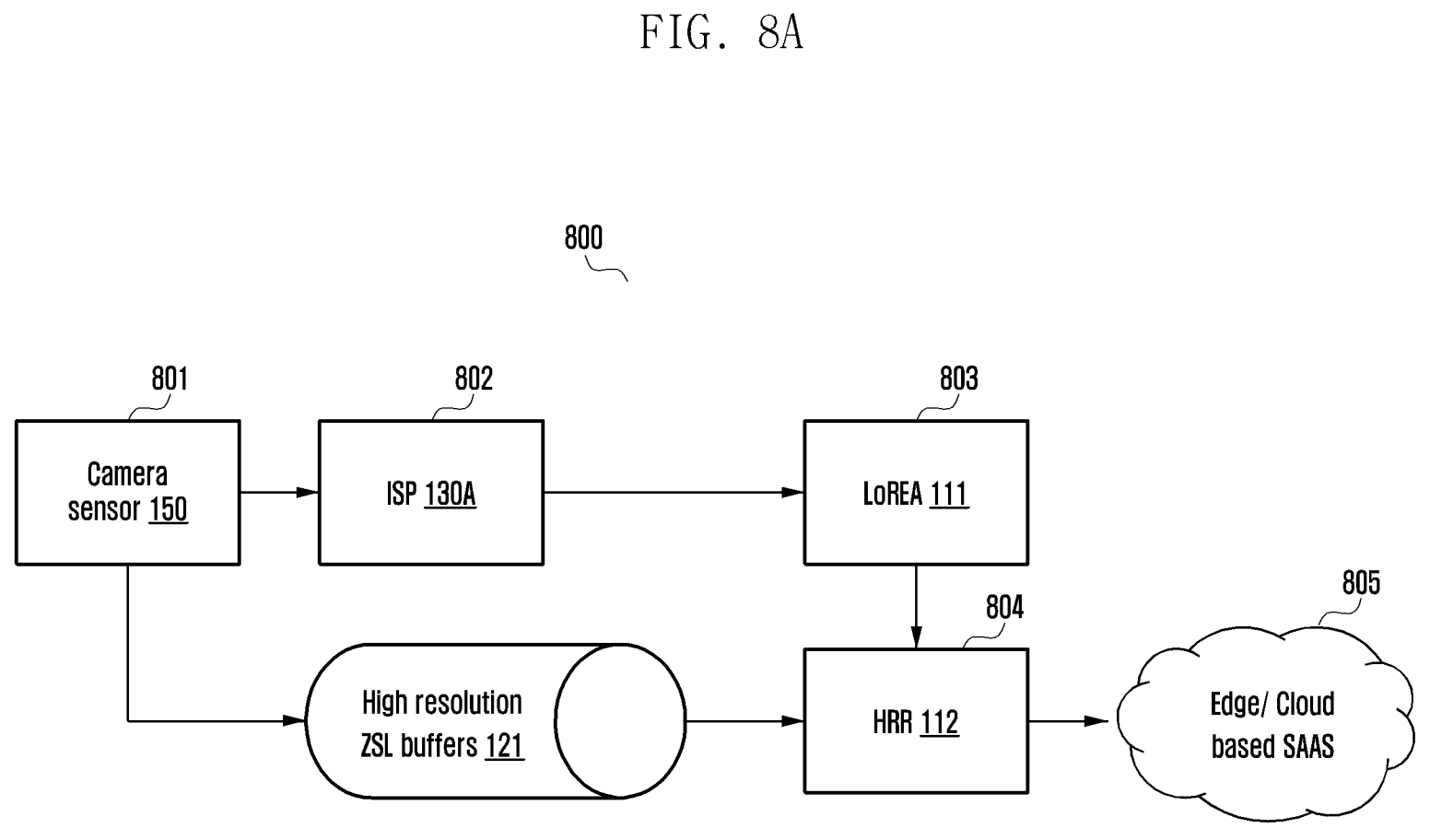

FIG. 8A is a flow diagram 800 of a method for optimizing a network bandwidth and a latency for cloud-based image processing, according to an embodiment. At operations 801 to 803, the LoREA 111 may receive the image frames from the camera sensor 150 via the ISP 130A. Further, the LoREA 111 may analyze the low-resolution image frames at the camera capture unit level before passing the low-resolution image frames to other processes and/or entities. At operations 804 and 805, the HRR 112 may select corresponding unprocessed high resolution raw image frames and send to the edge/cloud-based software-as-a-service (SAAS) for the image processing.

The method depicted in FIG. 8A may allow the user to choose the interested event as the input configuration for video recording and simultaneous event based high resolution photographic captures. The electronic device 100 may receive the continuous stream of the high-resolution image frames from the one or more camera sensors 150. Further, the electronic device 100 may derive the stream of low-resolution image frames using the high-resolution image frames from the one or more camera sensors 150 while simultaneously storing unprocessed high-resolution images in the high-resolution buffer 121. Further, the electronic device 100 may perform event analysis on the low-resolution image frames for computing the differential energy changes on the low-resolution image frames. Further, the electronic device 100 may determine the visual scores for each incoming low resolution image frame based on the interested event chosen by the user. Further, the electronic device 100 may derive the segments of the high-resolution images and/or the video of the interest and send the high-resolution images and/or the video to the edge/cloud based SAAS for further image post processing. Further, the edge/cloud based SAAS may perform additional analysis and/or processing of the derived segments and refine the selection process, thereby optimizing the network bandwidth and the latency at each stage of the cloud-based image processing.

Figure 8B:
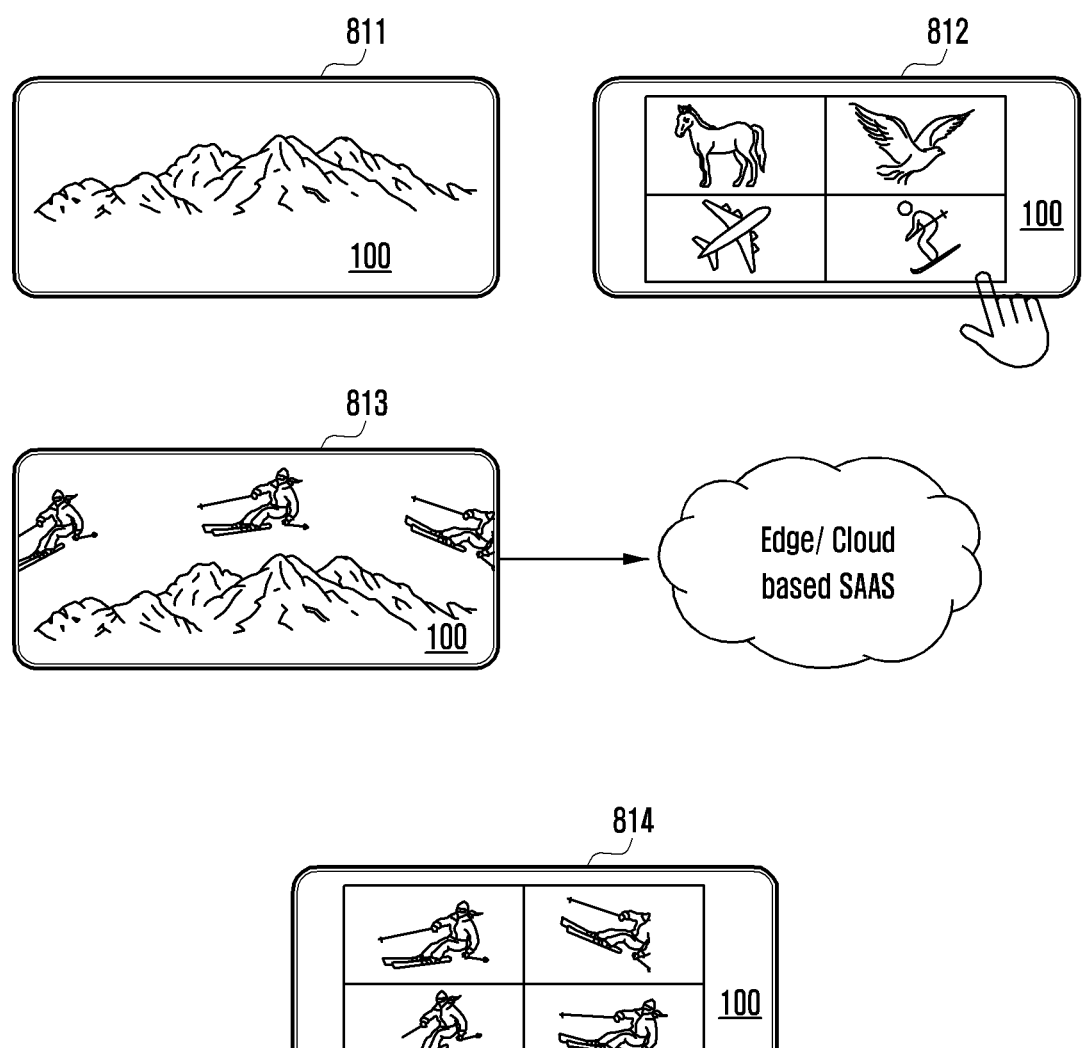
FIG. 8B illustrates an example scenario of optimizing the network bandwidth and the latency for the cloud based image processing, according to an embodiment.

FIG. 8B illustrates an example scenario of optimizing the network bandwidth and the latency for the cloud-based image processing, according to an embodiment. At operation 811, the user may start the preview of the scene in front of the camera sensor 150 of the electronic device 100. At operation 812, the user may choose the type of interested event as having moving objects, having substantially no (zero) background motion, and/or as a specific type of interested event (e.g., snow skiing). At operation 813, the electronic device 100 may start the event capture and stop after a certain duration while the user holds the electronic device 100. Further, the electronic device 100 may share the content via cloud and/or other simple notification service (SNS) applications. At operation 814, the electronic device 100 may continue recording of the video, and capture the reel (e.g., sequence of images) of the interested event by automatically updating the recorded video. At operation 816, the electronic device 100 may stop the video recording capture. At operation 817, remote users may get event captures directly shared through the cloud and/or other SNS applications.

The embodiments disclosed herein may be implemented using at least one hardware device and performing network management functions to control the elements.

The foregoing description of the specific embodiments may reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art may recognize that the embodiments herein may be practiced with modification within the scope of the embodiments as described herein.

What is claimed is:

1. A method of performing interested event based image capture by an electronic device, the method comprising:

receiving a plurality of image frames;

storing the plurality of image frames in a high-resolution buffer;

converting the plurality of image frames into a plurality of low-resolution image frames;

detecting an interested event in at least one low-resolution image frame of the plurality of low-resolution image frames;

determining a timestamp of the at least one detected low-resolution image frame and a visual score of the interested event in the at least one detected low-resolution image frame;

storing, in a memory of the electronic device, a list comprising the visual score and the timestamp of each of the at least one detected low-resolution image frame;

determining, from the list, a timestamp corresponding to a visual score satisfying a predetermined condition; and obtaining, from the high-resolution buffer, an image frame corresponding a low-resolution image frame having the determined timestamp corresponding to the visual score satisfying the predetermined condition.

2. The method of claim 1, wherein the detecting the interested event comprises:

determining an average intensity at each pixel location of one or more low-resolution image frames of the plurality of low-resolution image frames;

determining a differential intensity change at each pixel location of the one or more low-resolution image frames, based on the average intensity for each pixel location of the one or more low-resolution image frames; and based on determining that the differential intensity change for the at least one detected low-resolution image frame meets a differential intensity change threshold, detecting the interested event in the at least one detected low-resolution image frame of the one or more low-resolution image frames.

3. The method of claim 1, wherein the determining the visual score comprises:

determining the visual score of the interested event in the at least one detected low-resolution image frame, based on a spatiotemporal location of a differential intensity change and a magnitude of the differential intensity change.

4. The method of claim 1, further comprising:

maintaining the timestamp of the at least one detected low-resolution image frame, based on a sorted order of visual scores of the at least one detected low-resolution image frame over a sliding time window; and adjusting a size of the sliding time window to match a number of the plurality of image frames stored in the high-resolution buffer.

5. The method of claim 1, wherein the obtaining the image frame corresponding to the at least one detected low-resolution image frame comprises:

determining at least one timestamp having a higher visual score from the list stored in the memory of the electronic device compared to remaining visual scores from the list;

accessing timestamps of the plurality of image frames stored in the high-resolution buffer; and retrieving the image frame from the stored plurality of image frames based on a match between the at least one timestamp having the higher visual score and the timestamps of the stored plurality of image frames.

6. The method of claim 1, wherein the obtaining the image frame comprises:

obtaining, from the high-resolution buffer, the image frame while performing automatic snapshot capture, wherein the performing the automatic snapshot capture comprises at least one of previewing and recording a video in at least one of a live mode and a non-live mode.

7. The method of claim 1, further comprising:

deriving, based on the obtained image frame, at least one of segments of high-resolution images and a video of interest; and analyzing the at least one of the segments and the video for image post-processing.

8. The method of claim 1, wherein the detecting the interested event comprises:

receiving, from a user, an input identifying the interested event.

9. An electronic device for performing interested event based image capture, the electronic device comprising:

memory storing instructions; and a processor operatively connected to the memory, wherein the instructions, when executed by the processor, cause the electronic device to:

receive a plurality of image frames;

store the plurality of image frames in a high-resolution buffer;

convert the plurality of image frames into a plurality of low-resolution image frames;

detect an interested event in at least one low-resolution image frame of the plurality of low-resolution image frames;

determine a timestamp of the at least one detected low-resolution image frame and a visual score of the interested event in the at least one detected low-resolution image frame;

store, in the memory of the electronic device, a list comprising the visual score and the timestamp of each of the at least one detected low-resolution image frame;

determine, from the list, a timestamp corresponding to a visual score satisfying a predetermined condition; and obtain, from the high-resolution buffer, an image frame corresponding to a low-resolution image frame having the determined timestamp corresponding to the visual score satisfying the predetermined condition.

10. The electronic device of claim 9, wherein the memory stores further instructions which, when executed by the processor, cause the electronic device to:

determine an average intensity at each pixel location of one or more low-resolution image frames of the plurality of low-resolution image frames;

determine a differential intensity change at each pixel location of the one or more low-resolution image frames, based on the average intensity for each pixel location of one or more low-resolution image frames; and based on a determination that the differential intensity change for the at least one detected low-resolution image frame meets a differential intensity change threshold, detect the interested event in the at least one detected low-resolution image frame of the one or more low-resolution image frames.

11. The electronic device of claim 9, wherein the memory stores further instructions which, when executed by the processor, cause the electronic device to determine the visual score of the interested event for in the at least one detected low-resolution image frame, based on a spatiotemporal location of a differential intensity change and a magnitude of the differential intensity change.

12. The electronic device of claim 9, wherein the memory stores further instructions which, when executed by the processor, cause the electronic device to:

maintain the timestamp of the at least one detected low-resolution image frame, based on a sorted order of visual scores of the at least one detected low-resolution image frame over a sliding time window; and adjust a size of the sliding time window to match a number of the plurality of image frames stored in the high-resolution buffer.

13. The electronic device of claim 9, wherein the memory stores further instructions which, when executed by the processor, cause the electronic device to:

determine at least one timestamp having a higher visual score from the list stored in the memory of the electronic device compared to remaining visual scores from the list;

access timestamps of the plurality of image frames stored in the high-resolution buffer; and retrieve the image frame from the stored plurality of image frames based on a match between the at least one timestamp having the higher visual score and the timestamps of the stored plurality of image frames.

14. The electronic device of claim 9, wherein the memory stores further instructions which, when executed by the processor, cause the electronic device to:

derive, based on the obtained image frame, at least one of segments of high-resolution images and a video of interest; and analyze the at least one of the segments and the video for image post-processing.

15. The electronic device of claim 9, wherein the memory stores further instructions which, when executed by the processor, cause the electronic device to:

obtain, from the high-resolution buffer, the image frame while performing automatic snapshot capture, and wherein the automatic snapshot capture comprises performing at least one of previewing and recording a video in at least one of a live mode and a non-live mode.

16. The electronic device of claim 9, wherein the memory stores further instructions which, when executed by the processor, cause the electronic device to:

receive, from a user, an input identifying the interested event.

17. A method of performing interested event based image capture by an electronic device, the method comprising:

converting a plurality of image frames into a plurality of low-resolution image frames;

determining an average intensity at each pixel location of one or more low-resolution image frames of the plurality of low-resolution image frames;

determining a differential intensity change at each pixel location of the one or more low-resolution image frames, based on the average intensity for each pixel location of the one or more low-resolution image frames;

based on determining that a differential intensity change for the at least one low-resolution image frame meets a differential intensity change threshold, detecting an interested event in at least one low-resolution image frame of the one or more low-resolution image frames;

determining a timestamp of the at least one detected low-resolution image frame and a visual score of the interested event in the at least one detected low-resolution image frame;

storing, in a memory of the electronic device, a list comprising the visual score and the timestamp of each of the at least one detected low-resolution image frame;

determining, from the list, a timestamp corresponding to a visual score satisfying a predetermined condition; and obtaining, from a high-resolution buffer, an image frame corresponding to a low-resolution image frame from having the determined timestamp corresponding to the visual score satisfying the predetermined condition.

18. The method of claim 17, further comprising:

maintaining the timestamp of the at least one detected low-resolution image frame, based on a sorted order of visual scores of the at least one detected low-resolution image frame over a sliding time window; and adjusting a size of the sliding time window to match a number of the plurality of image frames stored in the high-resolution buffer.

\* \* \* \* \*